United States Patent [19]

Pitches et al.

[11] 4,150,767

[45] Apr. 24, 1979

[54] LIQUID BLENDING AND DISPENSING APPARATUS

[75] Inventors: Brian E. Pitches; Robert M. S. Murray, both of Edinburgh, Scotland

[73] Assignee: Ferranti Limited, Hollinwood, England

[21] Appl. No.: 718,336

[22] Filed: Aug. 27, 1976

[30] Foreign Application Priority Data

Aug. 30, 1975 [GB] United Kingdom ............... 35857/75

[51] Int. Cl.² .......................... B67D 5/08; B67D 5/56
[52] U.S. Cl. ...................................... 222/23; 222/57; 222/134; 235/92 FL
[58] Field of Search ....................... 222/26, 23, 25, 27, 222/28, 134, 57; 235/92 FL

[56] References Cited

U.S. PATENT DOCUMENTS

| 3,756,463 | 9/1973 | Gravina | 222/26 |
| 3,984,032 | 10/1976 | Hyde et al. | 222/26 |

Primary Examiner—Robert J. Spar
Assistant Examiner—Frederick R. Handren
Attorney, Agent, or Firm—Cameron, Kerkam, Sutton, Stowell & Stowell

[57] ABSTRACT

Liquid dispensing apparatus for dispensing a blend of first and second liquids has flowmeters operable to measure the quantity of each liquid delivered. The flowmeter outputs are multiplied by a factor equal to the proportion of one liquid in the blend and used to control a stepping motor which operates a blending valve. An error correction circuit is provided to correct for any accumulated error, and the apparatus also includes a cost determining circuit.

11 Claims, 2 Drawing Figures

LIQUID BLENDING AND DISPENSING APPARATUS

This invention relates to liquid dispensing systems, and in particular to a system for blending liquids such as petrol.

Modern petrol dispensing systems operate from supplies of two octane ratings, namely the highest and lowest octane ratings required. Any intermediate octane rating is provided by blending the two extreme ratings in the required proportions. Because of the legal limits on the octane rating of any required blend, such mixing must be done with great accuracy.

Petrol blending systems are known in which the supplies of the two extreme octane ratings are metered and the meter outputs are used to control a motorized blending valve which determines the blend supplies. However, many such systems allow blending errors to occur particularly when large movements of the blending valve are necessary.

It is an object of the invention to provide a liquid dispensing system in which the proportions of a blend are maintained within high limits.

According to the present invention there is provided liquid dispensing apparatus for dispensing a blend of first and second liquids which includes first and second flowmeters each operable to measure the delivered quantities of the first and second liquids respectively and to deliver an output pulse in response to the delivery of a predetermined volume of the liquid, multiplying means for multiplying the number of pulses delivered by each flowmeter by a factor equal to the proportion of one of said liquids in the required blend, subtractor means operable to subtract from the pulse output of the flowmeter measuring the flow of said one liquid the output of the multiplying means relating to that flowmeter, a stepping motor rotation of which in one direction decreases the proportion of the first liquid in the blend whilst rotation in the opposite direction increases the said proportion, a motor control circuit responsive to the pulse output of the subtractor means to cause the stepping motor to cause the stepping motor and responsive to the other pulse output of the multiplying means to cause the stepping motor to cause the stepping motor to rotate in the opposite direction, and error correction means responsive to the accumulated difference between the number of pulses applied to the stepping motor drive circuit from the subtractor means and from the said other output of the multiplying means to inhibit the response of the stepping motor to a number of input pulses determined by the said accumulated difference.

Also according to the invention apparatus as described in the preceding paragraph includes cost determining means operable to determine the total cost of the blend dispensed and comprising counter means responsive to each pulse from both the first and second flowmeters to store a number indicative of the cost per unit volume of the liquid blend dispensed, oscillator means operable to reduce the number held in the counter to zero between successive pulses from the first and second flowmeters, and storage means responsive to the number of pulses applied to the counter means by the oscillator to store the total cost of liquid dispensed.

Preferably the motor control circuit is arranged so that it causes appropriate rotation of the stepping motor only when at least two successive pulses are received from either the subtractor means or from the said other output of the multiplying means.

An embodiment of the invention will now be described with reference to the accompanying drawings, in which.

Figure 1:
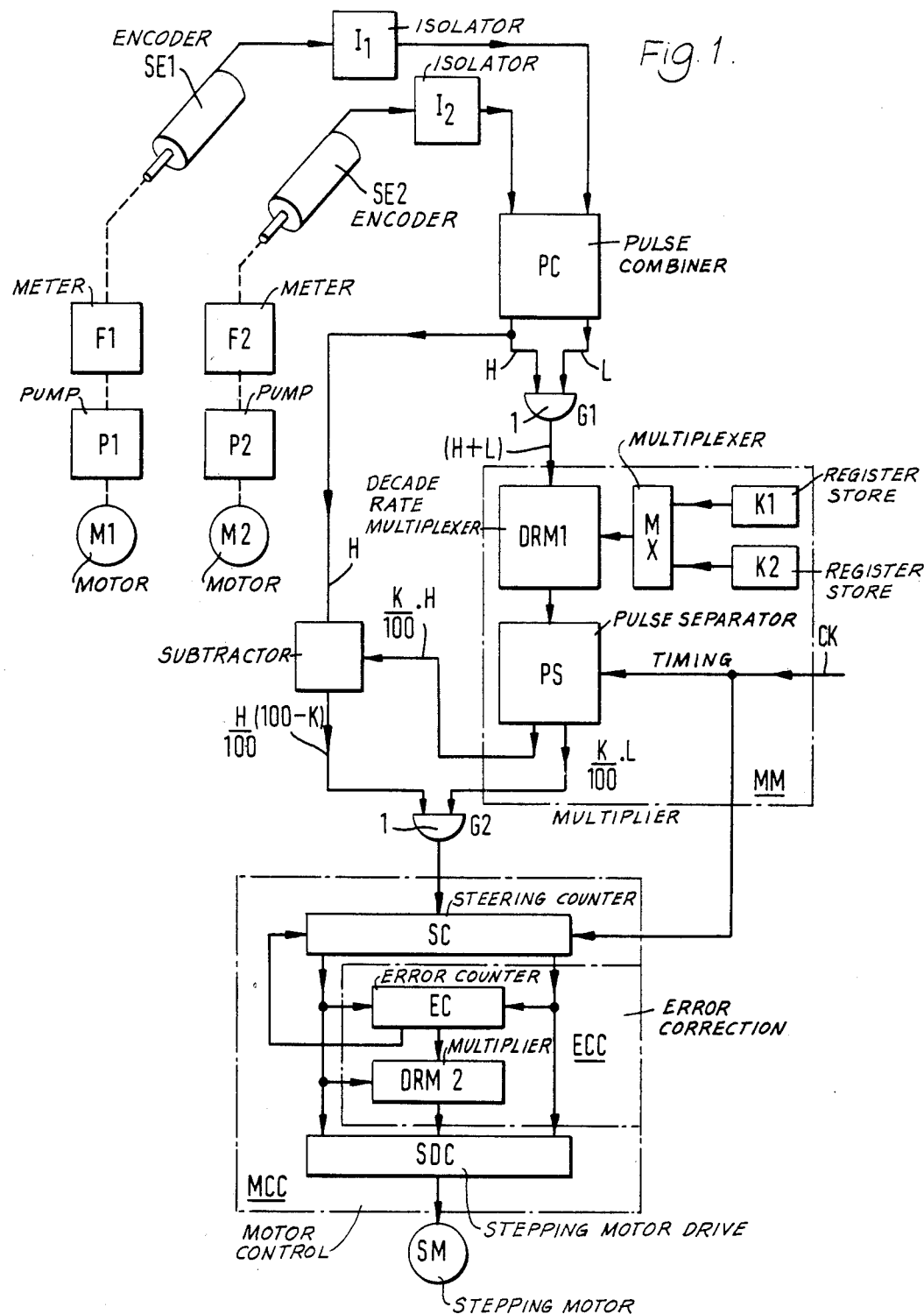
FIG. 1 is a block circuit diagram of a blender-type fuel pump controller.

Referring now to FIG. 1 this shows a blender type dispensing pump control system that is considered particularly suitable for implementing embodiments of this invention in relation to petrol filling station forecourts. From two petrol storage tanks, one for high octane and the other for low, four octane grades of petrol are to be supplied via hydraulic pumps P1, P2 and meters F1, F2 driven by electric motors M1 and M2 respectively. Optical shaft encoders SE1 and SE2 are associated with the hydraulic meters F1 and F2, respectively, for high and low octane deliveries. Pulses on the outputs from these encoders will represent predetermined volumes, for example, fractions of a gallon, but preferably amounts that allow simple conversion between Imperial and metral units of measurement. Five milliliters is an advantageous unit in that two such units give 100ths of a liter, and nine such units give 100ths of a gallon with only about 1% error, allowing great accuracy if every hundredth pulse is blocked, or, for best accuracy, every 97th or 98th pulse.

A suitable circuit allowing Imperial and Metric outputs could use one or more dividers providing separate pulse outputs on every 2nd, every 9th and every 100th pulse. The output on every 2nd pulse would directly represent each 100th of a liter. The 9th and 100th pulses would be applied to coincidence gating to suppress the next 97th or 98th pulses so that the 101st pulse of the train is deleted.

These pulses are shown applied to normally required intrinsic safety barriers I1 and I2 for preventing faults in the control electronics from causing sparks, and thus fire or explosion risks, in the electrical fuel pump drives. Suitable safety barriers are available commercially, and may be based on Zener barrier circuitry or, possibly, electro-optical isolators. Corresponding pulse signals are obtained on the output from the units I1 and I2 and are shown applied to pulse combining circuit PC arranged to ensure that pulses on its ouput lines correspond one-for-one with those on the input lines but are interleaved in time. Hence one of the two outputs is a train of pulses occurring at the same rate H as the pulses from the high-octane flowmeter encoder SE1, whilst the other output is a train of pulses occurring at the same rate L as the pulses from the low-octane flowmeter encoder SE2. The two pulse trains are applied to an OR gate G1, the output of which is a pulse train with pulses occurring at a rate (H+L). The output of the OR gate G1 is applied to a decade rate multiplier DRM1. This also has inputs from a multiplexer MX which itself receives inputs from two presettable storage means K1 and K2 which are preset to determine the proportions of high and low octane petrol in the two intermediate grades. The storage means K1 and K2 may be registers, counters or switch banks which are preset as required. Outputs are provided from these storage means when the intermediate fuel blends are selected. If the percentage of high-octane petrol in the blend is K, then the output of the rate multiplier DRM1 is a train of pulses occurring at a rate K.(H+L)/100. This output is applied, along with timing pulses CK, to a pulse separator PS where it is separated in accordance with the pulse timing, into two trains of pulses. Pulses occurring at a rate KL/100, representing the proportion of low octane petrol being delivered, are applied to one input of a second OR gate G2. The rate multiplier DRM1, multiplexer MX, presettable storage means K1 and K2, and pulse separator PS constitute the multiplying means MM of the invention. Pulses occurring at a rate KH/100, representing the proportion of high octane petrol being delivered, are applied to a subtractor SUB along with the original high octane pulses from the encoder SE1. The output from the subtractor is a pulse train at a rate H(100−K)/100. This pulse train is applied to the other input of the OR gate G2.

The output of OR gate G2 is connected to a motor control circuit MCC which includes a steering counter SC in the form of a reversible counter, which is also supplied with timing pulses CK. The steering counter SC provides two steering outputs to a stepping motor drive circuit SDC which itself controls the movement of a stepping motor SM which moves a blending valve (not shown) to control the blend of petrol delivered. The two steering outputs from the steering counter SC control the direction of movement of the stepping motor SM, either increasing or decreasing the proportion of high octane petrol in the blend.

The two outputs of the steering counter are also connected to an error correction circuit ECC comprising a reversible error counter EC and a decade rate multiplier DRM2. The contents of the error counter EC are applied to the rate multiplier DRM 2 together with the "increase" steering output from the steering counter. The output of the rate multiplier is connected to the steering motor drive circuit SDC. The error counter EC also has an output which is connected to the steering counter SC.

The operation of the blend control arrangement described above will now be described.

The pump motors M1, M2 and pumps P1, P2 are driven continuously, and the position of the blending valve determines the relative proportions of high and low octane petrols delivered to the customer. The rate of delivery of these two constituents of the blend, namely H and L, are indicated continuously. As already stated, the required percentage of high octane petrol in the blend is K, and a correct blend is being delivered when the pulse rates at the two inputs of OR gate G2, namely KL/100 and H(100−K)/100, are equal. Hence, when this situation exists, the output of gate G2 comprises alternate pulses from each train. Pulses are therefore applied alternately to the two steering outputs from the steering counter SC to the stepping motor drive circuit SDC. To prevent continuous hunting of the stepping motor, the drive circuit SDC may be arranged to require two successive pulses on the same steering line before movement of the motor can take place. Hence the alternate pulses resulting from a correct blend will cause no movement of the stepping motor.

The error counter receives the alternate pulses on the two steering outputs from the steering counter SC and hence counts one pulse on either side of the all-zeros state. The output from the error counter EC to the steering counter SC is used to indicate the sign of the contents of the error counter, to compensate for the fact that the direction of count needs to change to prevent erroneous operation of the error counter.

If, for some reason, the blender valve is moved to such a position that the delivered blend is, say, of too high an octane rating, then the proportion of pulses applied to the OR gate G2 from the subtractor SUB will be higher than the proportion of pulses from the pulse separator PS. The steering counter will therefore apply to the stepping motor drive circuit SDC more pulses on the "decrease high octane" steering line than on the other steering line. This will result in movement of the blending valve until the error is correct. However, what this does not take into account is the excess quantity of high octane petrol actually delivered before correction was complete. The error counter EC counts the difference between the pulse rates on the two steering lines from the steering counter SC, and thus holds a number which indicates the accumulated error in the blend delivered. This count is multiplied by the pulse rate on the "increase high octane" steering line so that a proportion of the following pulses on that line are ignored by the stepping motor drive circuit SDC; this results in an excess delivery of low octane petrol to correct for the excess of high octane petrol previously delivered.

The situation described above is most likely to occur when the blend of fuel selected by a customer differs from that selected by the previous customer, since in such a case a short time elapses after delivery is started before the blending valve reaches the desired position. It is during this time that the accumulated error builds up.

If delivery of one or other of the constituents of the required blend shoud cease then only either high or low octane pulses will be delivered. This will rapidly cause the blending valve to move to a position where no fuel will be delivered. The error counter will build up a large count, but unless delivery of that constituent is restored the error cannot be corrected.

If one of the extreme grades is selected by a customer, it is preferable to drive the blending valve to the appropriate limit before delivery commences, thus preventing the build-up of any error in the octane rating of the fuel delivered. In this case the stepping motor SM is driven by some means which is not shown, and the pump motor providing the other extreme grade of petrol will not be started.

Figure 2:
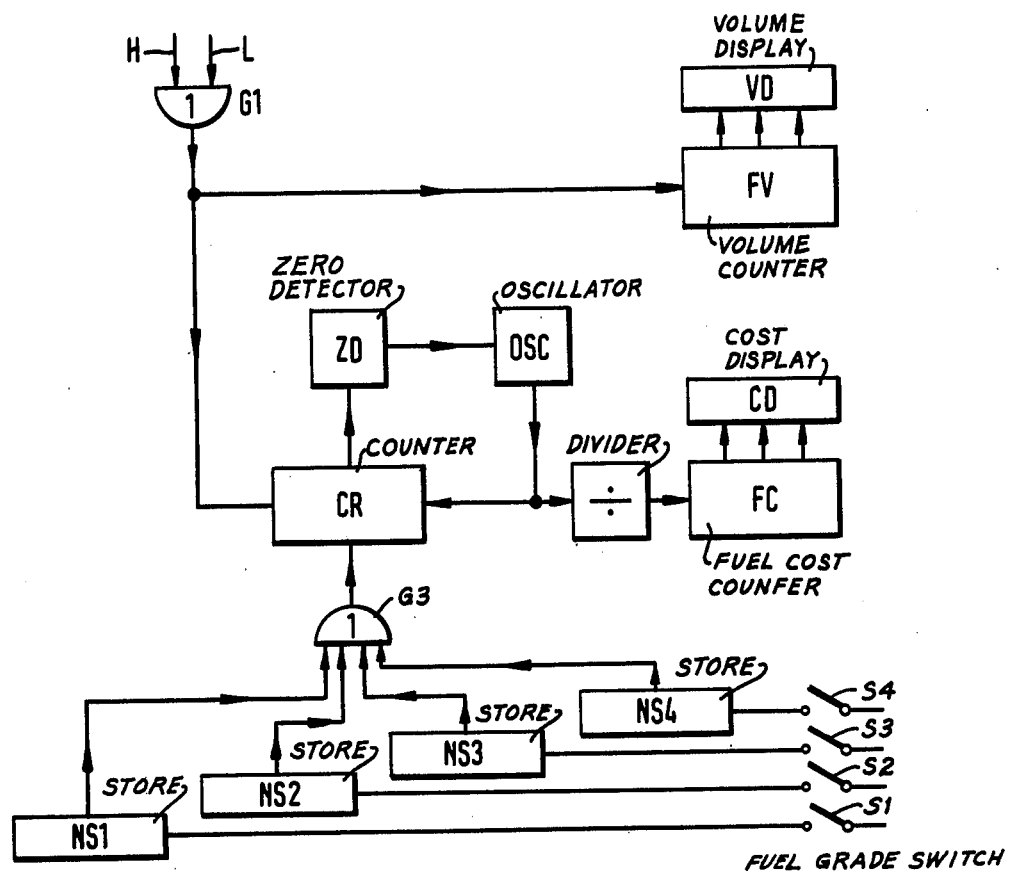
FIG. 2 is a block circuit diagram of price and quantity determining means for use with the controller of FIG. 1.

FIG. 2 shows the block diagram of a circuit for determining and indicating the price and volume of fuel delivered. The gate G1 is the component of the same reference in FIG. 1, delivering an output train of pulses at a rate (H+L). Since each pulse, from either flow meter, represents a fixed quantity of fuel, the output of OR gate G1 is applied directly to a fuel volume counter FV which is itself connected to a volume display VD. This display therefore indicates at any time the total volume of fuel delivered.

The output of OR gate G1 is also applied the "load" input of a counter CR. This counter is arranged to have a number applied to it from one or other of four number stores NS1 to NS4 via an OR gate G3. The number stores may be counters, registers or switch banks and are preset to the cost per unit volume of the four possible fuel octane ratings. Selection of a grade by a customer involves operating the appropriate switch S1–S4 which activates the associated number store. The stages of the counter CR are connected to a zero detector ZD, the output of which controls an oscillator OSC. The oscillator is connected to the counter CR input and, through a dividing circuit to a fuel cost counter FC. This counter controls a fuel cost display CD.

In operation, as already stated, a customer selects an octane rating and hence activates one of the number stores NS1 to NS4. Each fuel delivery pulse received by the counter from OR gate G1 causes the number held in the number counter to be loaded into the counter CR, a higher number representing a higher octane rating than a lower number. The act of loading the number into the counter removes the all-zeros state of the counter, and the change in output from the zero detector ZD allows the oscillator OSC to apply pulses to the counter CR to reduce the count held in it to zero. The frequency of oscillation of the oscillator must be sufficiently high to allow the counter CR to be counted down to zero between the arrival of successive pulses from OR gate G1.

When the number in the counter CR is reduced to zero, the operation of the zero detector ZD stops the application of pulses from the oscillator OSC. The pulses applied to the counter CR from the oscillator OSC are applied through a divider to the fuel cost counter FC. The dividing factor of the divider must be such that the pulses applied to the fuel cost counter represent the cost of one unit of fuel. The fuel cost display CD thus indicates at any time the total cost of the fuel delivered.

The operation of the circuit of FIG. 2 assumes that the blend control of FIG. 1 is operating correctly. Hence the number held in the number store NS selected represents the appropriate cost per unit volume of the blend selected and is not required to consider one cost per unit volume of high octane petrol for each pulse from the high octane flowmeter and a different cost per unit volume of low octane petrol for each pulse from the low octane flowmeter.

In the present invention, each of the circuit blocks shown in the figures comprises known integrated circuit elements of the McMOS and reference may be made to the McMOS Integrated Circuits Data Book, First Edition 1973, Motorola, Inc., which presents technical data and specifications for the individual monolithic circuit elements for a more detailed description thereof. The decade rate multiplier DRM 1 and DRM 2 may be an MC 14527 device, while the error counter EC and counters CR may be an MC 14510 type counter. Pulse separator, PS, Subtractor, SUB, steering counter, SC, and stepping motor drive circuit are built up from two or more circuit elements. For example, block PS is formed by two MC 14001—input Norgates and 2 MC 14049 invertors. The subtractor, SUB, is a conventional subtractor circuit and may be made up by combining 1 MC 14001 Norgate and 1 MC 14013 D-type bistable circuit. The stepping motor drive circuit utilizes several MC 14001 Norgates, MC 4013 D-type bistables, MC 14507 exclusive Norgates, MC invertors and MC 14050 buffers. The SC lock is also made up of integrated logic elements of the MC 1400's series arranged to steer the pulses in the manner indicated. While Motorola IC components have been chosen for illustrative purposes, obviously, any equivalent circuit of another manufacturer may be utilized.

What we claim is:

1. Liquid dispensing apparatus for dispensing a blend of first and second liquids which includes first and second flowmeters each operable to measure the delivered quantities of the first and second liquids respectively and to deliver an output pulse in response to the delivery of a predetermined volume of the liquid, multiplying means for multiplying the number of pulses delivered by each flowmeter by a factor equal to the proportion of one of said liquids in the required blend, subtractor means operable to subtract from the pulse output of the flowmeter measuring flow of said one liquid the output of the multiplying means relating to that flowmeter, a stepping motor rotation of which in one direction decreases the proportion of said one liquid in the blend whilst rotation in the opposite direction increases the said proportion, a motor control circuit responsive to the pulse output from the subtractor to cause the stepping motor to rotate in one direction and responsive to the other output of the multiplying means to cause the stepping motor to rotate in the opposite direction, and error correction means responsive to the accumulated difference between the number of pulses applied to the stepping motor drive circuit from the subtractor means and from the said other output of the multiplying means to inhibit the response of the stepping motor to a number of input pulses determined by the said accumulated difference.

2. Apparatus as claimed in claim 1 in which the multiplying means includes presettable storage means operable to store a number indicative of said proportion, and a rate multiplier operable to multiply the applied pulse rate by said number.

3. Apparatus as claimed in claim 2 which includes means for interleaving the trains of pulses from the two flowmeters prior to their application to the rate multiplier and further means for separating out two pulse trains from the output of the rate multiplier.

4. Apparatus as claimed in claim 1 which includes means for combining the outputs from the subtractor and from the said other output of the multiplying means into a single pulse train for application to the motor control circuit.

5. Apparatus as claimed in claim 1 in which the stepping motor control circuit is arranged to cause the appropriate rotation of the stepping motor only when at least two successive pulses are received from either the subtractor means or from the said other output of the multiplying means.

6. Apparatus as claimed in claim 5 in which the motor control circuit includes a steering counter responsive to the pulses from the subtractor and from the said other output of the multiplying means to provide signals on either of two steering lines, and a steering motor drive circuit responsive to the signals on the steering lines to cause the appropriate rotation of the stepping motor.

7. Apparatus as claimed in claim 6 in which the error correcting means includes a reversible counter responsive to the signals on the two steering lines to store the difference between the numbers of pulses on each steering line.

8. Apparatus as claimed in claim 7 in which the error correcting means includes a multiplier operable to multiply the number of pulses on one steering line by the number held in the reversible counter, the output of the multiplier being applied to the motor drive circuit to inhibit the response of the stepping motor to a number of pulses on said one steering line.

9. Apparatus as claimed in claim 1 which includes cost determining means operable to determine the total cost of the blend dispensed and comprising counter means responsive to each pulse from both the first and second flowmeters to store a number indicative of the cost per unit volume of the liquid blend dispensed oscillator means operable to reduce the number held in the counter to zero between successive pulses from the first and second flowmeters, and storage means responsive to the number of pulses applied to the counter means by the oscillator to store the total cost of liquid dispensed.

10. Apparatus as claimed in claim 9 in which the counter means includes a zero detector operable to stop the application of the oscillator output of the counter when the counter is in the all-zeros state.

11. Apparatus as claimed in claim 10 which includes divider means connected between the oscillator and the storage means.

* * * * *